(12) United States Patent
Aylsworth

(10) Patent No.: US 11,014,768 B2
(45) Date of Patent: May 25, 2021

(54) PASS-UNDER LUMBER TRANSFER METHODS AND SYSTEMS

(71) Applicant: Steven L. Aylsworth, Fountain, MN (US)

(72) Inventor: Steven L. Aylsworth, Fountain, MN (US)

(\*) Notice: Subject to any disclaimer, the term of this patent is extended or adjusted under 35 U.S.C. 154(b) by 0 days.

(21) Appl. No.: 16/843,427

(22) Filed: Apr. 8, 2020

(65) Prior Publication Data

US 2020/0324432 A1 Oct. 15, 2020

Related U.S. Application Data

(60) Provisional application No. 62/832,366, filed on Apr. 11, 2019.

(51) Int. Cl.
*B65G 59/02* (2006.01)
*B65H 5/02* (2006.01)
(Continued)

(52) U.S. Cl.
CPC .............. *B65G 59/02* (2013.01); *B65H 5/02* (2013.01); *B27B 25/00* (2013.01); *B65G 1/0442* (2013.01);
(Continued)

(58) Field of Classification Search
CPC ......... B27B 25/00; B27B 25/04; B27B 25/02; B27B 31/00; B65G 59/02; B65G 61/00;
(Continued)

(56) References Cited

U.S. PATENT DOCUMENTS 561,715 A 6/1896 Lynch
2,730,144 A 1/1956 Joa
(Continued)

FOREIGN PATENT DOCUMENTS

DE 2501012 A1 7/1976
DE 4317767 A1 12/1994
(Continued)

OTHER PUBLICATIONS

Miser; Automated Wood Processing System; Koskovich brochure; 5 pgs.; Rochester, MN; copyright 2007.
(Continued)

*Primary Examiner* — Gregory W Adams
(74) *Attorney, Agent, or Firm* — www.bobharter.com; Robert J. Harter

(57) ABSTRACT

A lumber transfer system includes an overhead track and a lower conveyor for retrieving and delivering boards from multiple racks of lumber to a platform leading to a saw. In some examples of operation, a board picker travels along the track to pick up a chosen board from one of the racks. The board picker then releases the board onto the conveyor. The conveyor conveys the board underneath the other racks and delivers the board to the saw feed platform. While the conveyor is conveying the board toward the saw feed platform, the board picker returns to the racks for another board. The board picker traveling along the track and handling boards while the conveyor delivers them to the saw saves production time and increases throughput.

20 Claims, 16 Drawing Sheets

(51) Int. Cl.
  *B27B 25/00* (2006.01)
  *B65G 61/00* (2006.01)
  *B65G 1/04* (2006.01)

(52) U.S. Cl.
  CPC ...... *B65G 61/00* (2013.01); *B65G 2201/0282* (2013.01)

(58) Field of Classification Search
  CPC ............... B65G 1/0442; B65G 2201/0282; B23Q 7/04; B23Q 7/042; B23Q 7/03; B23Q 7/001; B23Q 7/003; B21D 43/006
  See application file for complete search history.

(56) References Cited

U.S. PATENT DOCUMENTS

| | | | |
|---|---|---|---|
| 3,116,835 A | | 1/1964 | Brandon |
| 3,254,764 A | | 7/1966 | Boyle |
| 3,272,044 A | | 9/1966 | Obenshain |
| 3,696,948 A | * | 10/1972 | Murdoch ............... B65G 47/44 414/564 |
| 3,822,815 A | * | 7/1974 | Davis ..................... B23Q 7/03 227/7 |
| 3,873,000 A | | 3/1975 | Eaton et al. |
| 3,894,625 A | | 7/1975 | Boyle et al. |
| 3,952,883 A | | 4/1976 | Phillips |
| 4,039,112 A | * | 8/1977 | Schultz ................... B27F 7/003 227/40 |
| 4,185,672 A | | 1/1980 | Vit et al. |
| 4,299,524 A | * | 11/1981 | Sawada ................. B65G 59/02 414/796.5 |
| 4,560,456 A | | 12/1985 | Heil et al. |
| 4,610,360 A | | 9/1986 | Forslund |
| 4,640,655 A | | 2/1987 | Jacobsen |
| 4,838,748 A | | 6/1989 | Johnson |
| 5,096,090 A | | 3/1992 | Schwartz et al. |
| 5,249,915 A | | 10/1993 | Ritola |
| 5,806,868 A | | 9/1998 | Collins |
| 5,879,129 A | | 3/1999 | Newnes et al. |
| 5,893,468 A | | 4/1999 | Holmes |
| 5,899,659 A | | 5/1999 | Beilsmith |
| 6,065,927 A | | 5/2000 | Baron et al. |
| 6,379,105 B1 | | 4/2002 | Aylsworth |
| 6,923,614 B2 | | 8/2005 | Aylsworth |
| 7,736,120 B2 | | 6/2010 | Pierson et al. |
| 7,746,481 B2 | | 6/2010 | Kranz et al. |
| 7,950,316 B2 | | 5/2011 | Koskovich |
| 8,348,287 B1 | | 1/2013 | Smith |
| 8,960,244 B1 | | 2/2015 | Aylsworth |
| 10,239,224 B2 | | 3/2019 | Aylsworth |
| 10,280,006 B1 | | 5/2019 | Aylsworth |
| 10,421,209 B2 | | 9/2019 | Aylsworth |
| 10,472,178 B2 | | 11/2019 | Aylsworth |
| 10,525,587 B2 | | 1/2020 | Aylsworth |
| 2003/0006586 A1 | | 1/2003 | Comilla |
| 2015/0086319 A1 | * | 3/2015 | Martini .................. B65G 61/00 414/795.4 |
| 2017/0113882 A1 | | 4/2017 | Aylsworth |
| 2017/0217022 A1 | | 8/2017 | Aylsworth |
| 2017/0305029 A1 | | 10/2017 | Aylsworth |
| 2018/0001508 A1 | | 1/2018 | Aylsworth |
| 2019/0275694 A1 | | 9/2019 | Aylsworth |

FOREIGN PATENT DOCUMENTS

| | | | |
|---|---|---|---|
| DE | 19617818 A1 * | 11/1997 | ............. B27B 15/02 |
| DE | 19617818 A1 | 11/1997 | |
| FR | 2673923 A1 | 9/1992 | |
| FR | 2675493 A1 | 10/1992 | |

OTHER PUBLICATIONS

Omni; Automated Lumber Processing System; CAD drawings; 2 pgs.; published 2008 or earlier.

Wood Truss Systems; 2006 Weinmann WBZ 100 Linear Saw; sales advertisement; 2 pgs., equipment itself in publich domain in 2006 or earlier.

Handling Portal WHP; Weinmann sales specs.; one page; published 2008 or earlier.

Stiles; Weinmann Robotic Saw System; sales literature and equipment specs; 6 pages; equipment itself in public domain in 2006 or earlier.

Stiles, Weinmann Robotic Saw System and Material Handling Portal, sales advertisement in SBC magazine; 1 page; Madison, WI; published Sep. 2008.

SBC; SBC Magazine; 33 pages; Madison, WI; Sep. 2008.

Mereen-Johnson, Rip Navigator Rip Optimizing Systems, video published via YouTube.com on Mar. 10, 2016; wwwyoutube.com/watch?v=DgMIFPFLm9M.

* cited by examiner

PASS-UNDER LUMBER TRANSFER METHODS AND SYSTEMS

CROSS REFERENCE TO RELATED APPLICATIONS

This present application claims the benefit of provisional patent application Ser. No. 62/832,366 filed on Apr. 11, 2019.

FIELD OF THE DISCLOSURE

The subject invention generally pertains to material handling equipment and more specifically to the delivery of lumber to a saw.

BACKGROUND

Various machines and methods have been developed for retrieving individual pieces of lumber or boards stacked at one or more locations and feeding the boards individually to a saw. Examples of such systems are disclosed in U.S. Pat. Nos. 6,379,105 and 6,923,614; both of which are specifically incorporated herein by reference. Additional lumber handling systems are disclosed in U.S. Pat. Nos. 2,730,144; 3,873,000 and 3,952,883; all of which are specifically incorporated herein by reference. A lumber processing system for making prefabricated trusses and panels is disclosed in U.S. Pat. No. 7,950,316; which is specifically incorporated herein by reference.

DETAILED DESCRIPTION

FIGS. 1-24 show an example lumber transfer system 10 and methods thereof. FIGS. 25-28 show an alternate example extendible rack 12 that can be used with lumber transfer system 10 of FIGS. 1-24. FIGS. 29-34 show additional examples.

Figure 31:
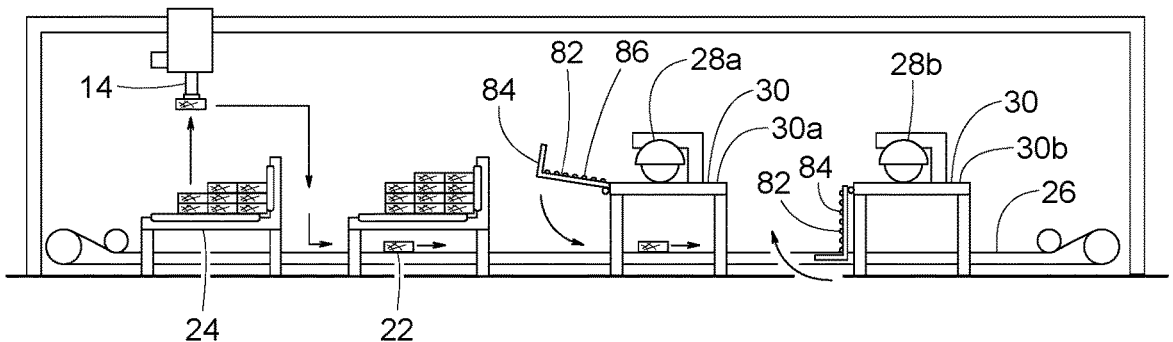
FIG. 31 is a side view of another example lumber transfer system.
Figure 32:
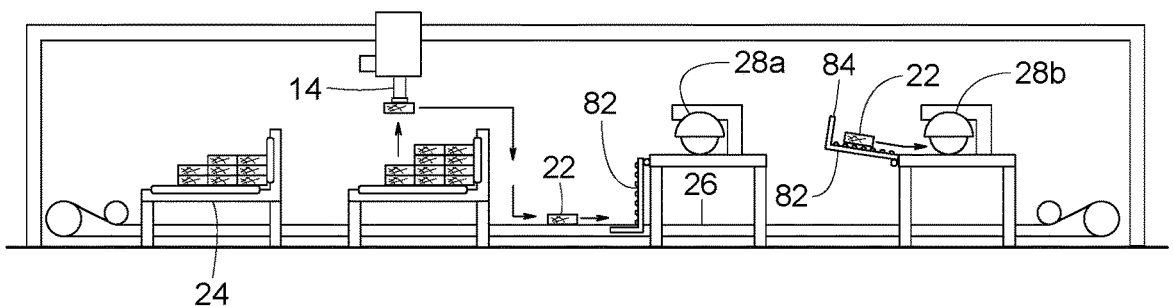
FIG. 32 is a side view similar to FIG. 31 but showing the lumber transfer system in another operating configuration.
Figure 33:
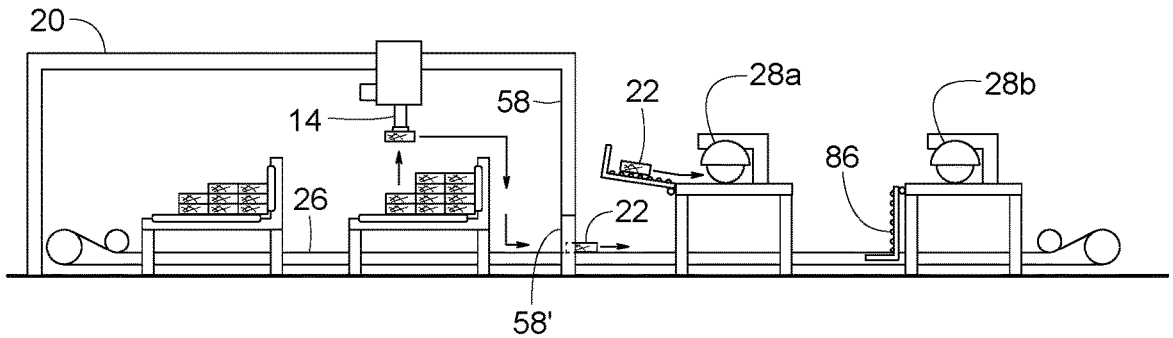
FIG. 33 is a side view of another example lumber transfer system.

In some examples, one or more vertically extendible board pickers 14 (e.g., a first board picker 14a, a second board picker 14b, etc.) carried by one or more track-mounted trolleys 16 that travel in a first direction 18 along an overhead track system 20 transfer a plurality of boards 22 (e.g., a first board 22a, a second board 22b, a third board 22c, a first stack of lumber 22d, a second stack of lumber 22e, etc.) from a plurality of racks 24 (e.g., a first rack 24a, a second rack 24b, etc.) to a conveyor 26 that extends underneath racks 24. This allows board pickers 14 (e.g., suction cups, board grippers, etc.) to retrieve second board 22b while conveyor 26 delivers first board 22a to a saw 28 (e.g., a first saw 28a, a second saw 28b, etc., as shown in FIGS. 31-33). As a result, boards 22 are retrieved and delivered more frequently, which increases the throughput of lumber transfer system 10. In some examples, board pickers 14 and/or trolleys 16 are constructed as disclosed in U.S. Pat. Nos. 8,960,244 and 10,239,224; both of which are specifically incorporated herein by reference. Some other details of lumber transfer system 10 and methods thereof may be found in U.S. Pat. Nos. 8,960,244; 10,280,006; 10,421,209; 10,239,224; 10,472,178 and 10,525,587; all of which are specifically incorporated herein by reference. The term, "rack" refers to any platform, tabletop or surface (movable or stationary) upon which boards can be placed.

In the example shown in FIGS. 1-24, lumber transfer system 10 includes first rack 24a supporting first stack of lumber 22d, second rack 24b supporting second stack of lumber 22e, a first saw feed platform 30a for feeding boards 22 to first saw 28a, conveyor 26 for conveying boards 22 from racks 24a and 24b toward first saw feed platform 30a, track system 20 above racks 24a and 24b, and an elevator 32 for lifting boards 22 from conveyor 26 onto first saw feed platform 30a. In some examples, conveyor 26 is longer than track system 20. This allows conveyor 26 to serve multiple racks 24 and multiple saw feed platforms 30 without the need for an overly long track system. The term, "saw feed platform" refers to any structure having an upward facing surface upon which boards thereon can be transferred toward a saw. Some examples of a saw feed platform include a tabletop, a roller conveyor, a belt conveyor, combinations thereof, etc.

In some examples, a shuttle cart 34 is movable along first direction 18 to loading areas 36 and 38 for replenishing the two racks 24a and 24b with boards 22. In some examples, both the shuttle cart 34 and racks 24 have rollers 40 to facilitate the transfer of boards 22 in a lateral second direction 42 from shuttle cart 34 to racks 24, wherein second direction 42 is substantially perpendicular to first direction 18.

Figure 27:
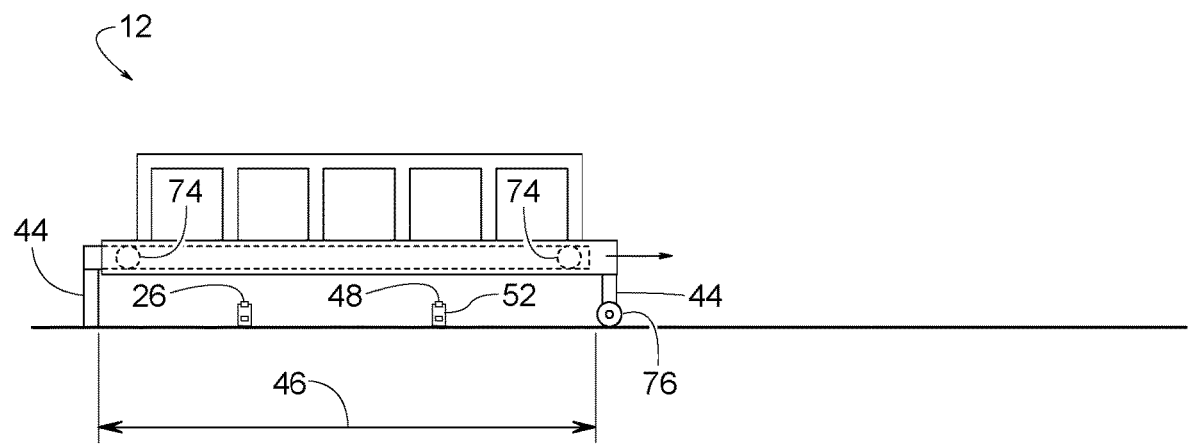
FIG. 27 is a cross-sectional view taken along line 27-27 of FIG. 25.
Figure 28:
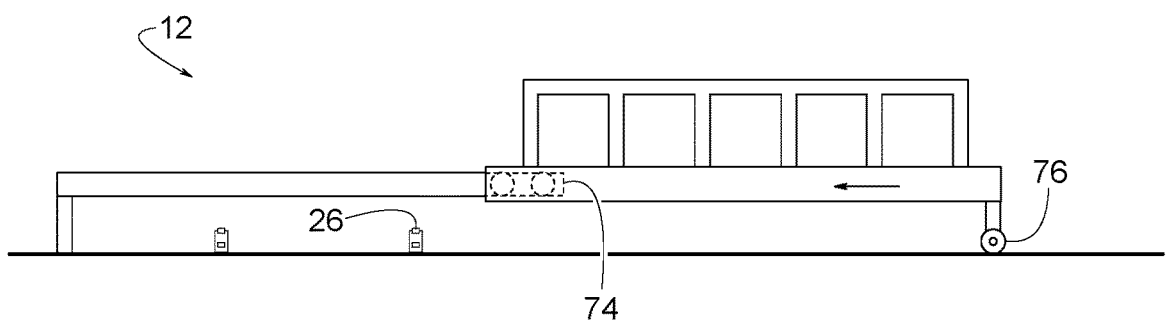
FIG. 28 is a cross-sectional view taken along line 28-28 of FIG. 26.

In some examples, racks 24 and saw feed platform 30 (e.g., first saw feed platform 30a and second saw feed platform 30b) include legs 44 that are laterally spaced apart 46 in second direction 42. Legs 44 being spaced apart in addition to racks 24 and saw feed platform 30 being elevated provides both lateral and vertical clearance for conveyor 26 to convey boards 22 underneath racks 24 and/or under saw feed platform 30. To maximize vertical clearance, some examples of conveyor 26 are of a low profile design that includes a roller chain 48 driven by a drive sprocket 50 and supported and guided by channels 52 of UHMW polyethylene (FIGS. 27 and 28). To prevent track system 20 from obstructing the board's path underneath racks 24 and/or under saw feed platform 30, some examples of track system 20 include a forward leg 54 anchored at a point 56 that is well above conveyor 26. In other examples, as shown in FIG. 33, an alternate forward leg 58 includes a pair of laterally spaced apart legs 58' to allow the passage of boards 22 therebetween.

Figure 1:
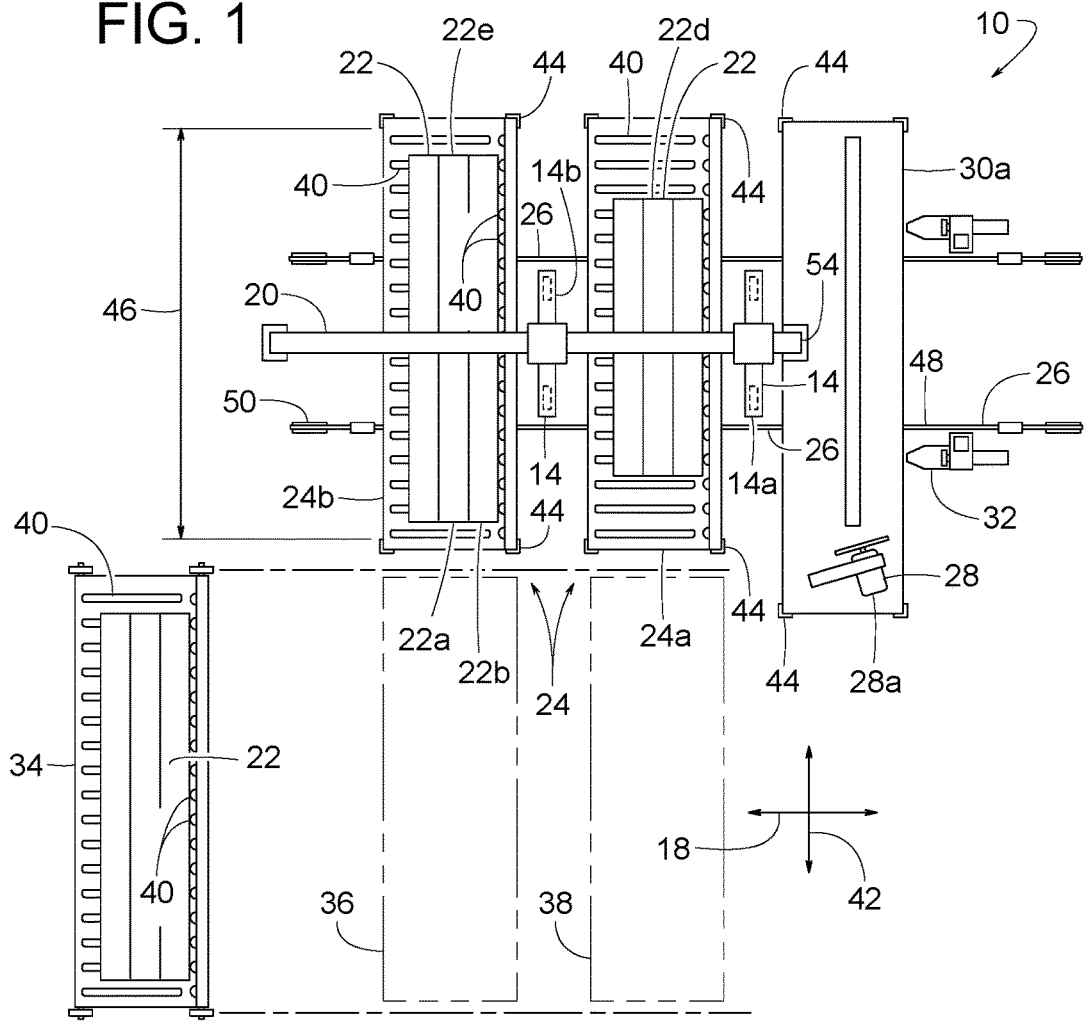
FIG. 1 is a top view of an example lumber transfer system in one operating configuration.
Figure 2:
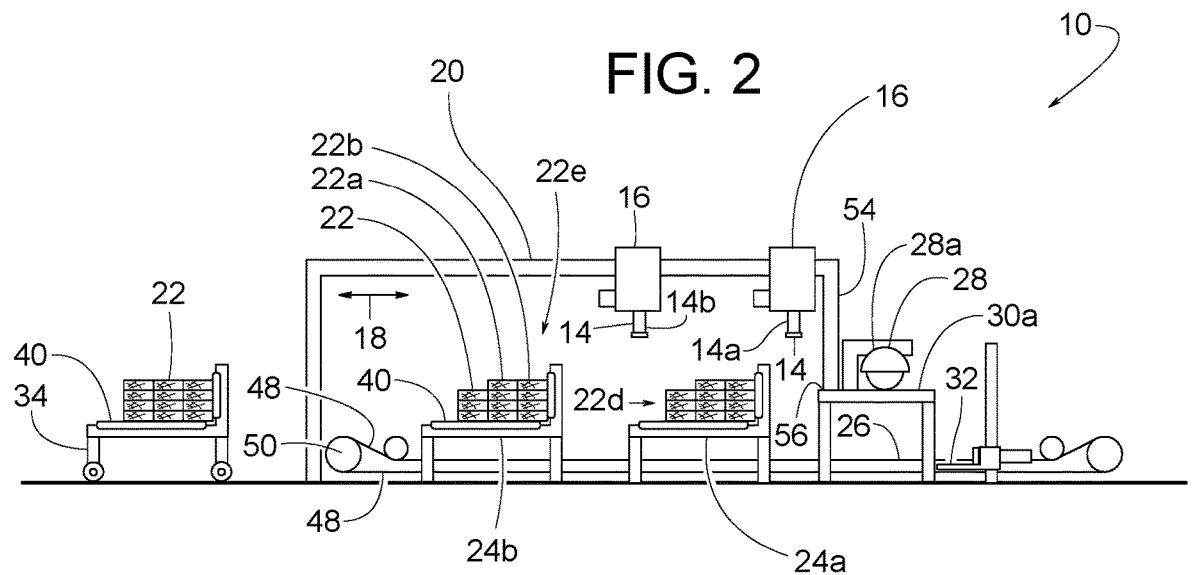
FIG. 2 is a side view of FIG. 1.
Figure 3:
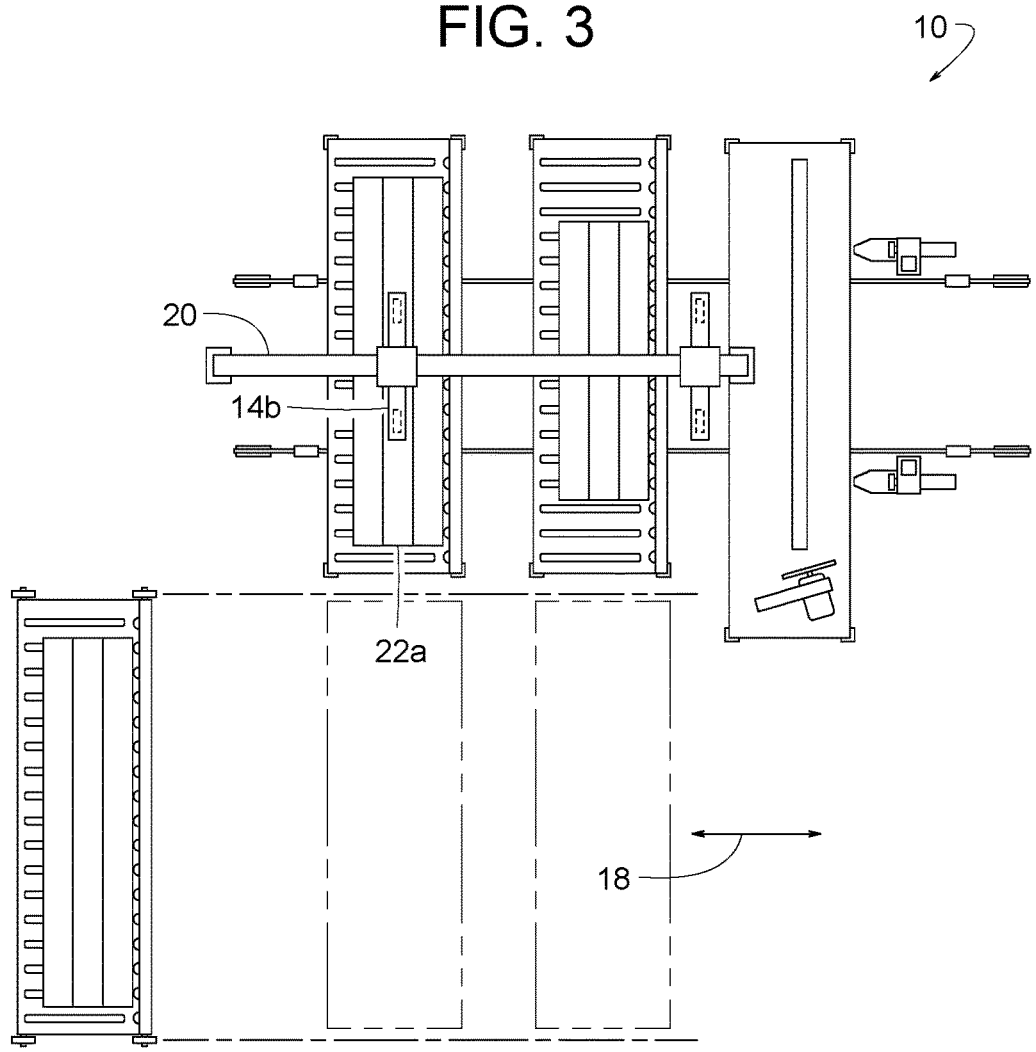
FIG. 3 is a top view of the example lumber transfer system of FIG. 1 but shown in another operating configuration.
Figure 4:
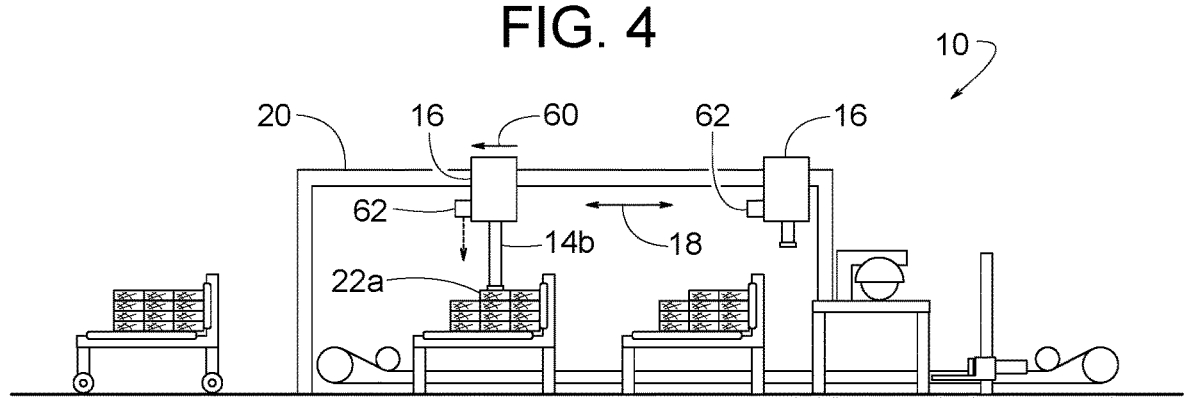
FIG. 4 is a side view of FIG. 3.

FIGS. 1-24 show lumber transfer system 10 in one example sequence of operation. To start, FIGS. 1 and 2 show lumber transfer system 10 in a ready position. FIGS. 3 and 4 show second board picker 14b having traveled rearward 60 in first direction 18 along track system 20 to pick up first board 22a. Laser sensors 62 on each trolley 16 can help locate the position of first board 22a. FIG. 4 shows second board picker 14b extending down to engage and pick up first board 22a.

Figure 5:
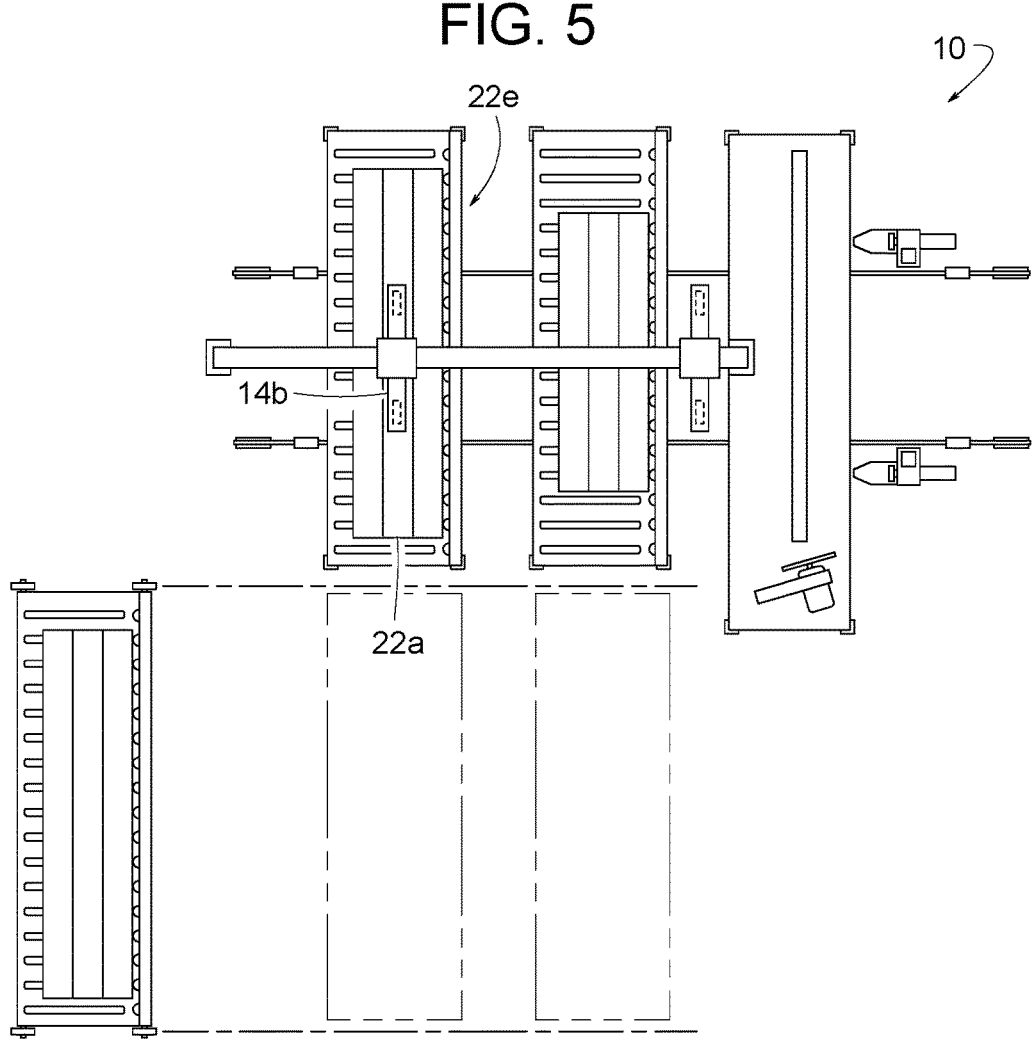
FIG. 5 is a top view of the example lumber transfer system of FIG. 1 but shown in another operating configuration.
Figure 6:
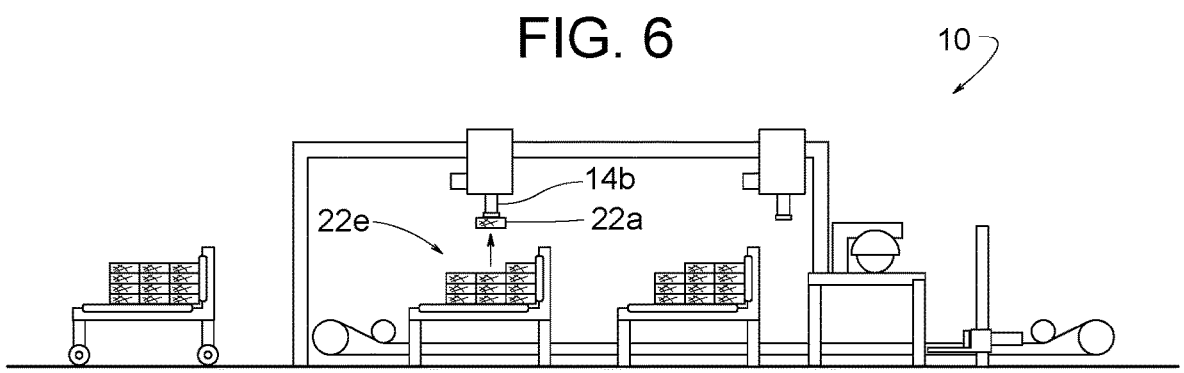
FIG. 6 is a side view of FIG. 5.

FIGS. 5 and 6 show second board picker 14b lifting first board 22a up from second stack of lumber 22e.

Figure 7:
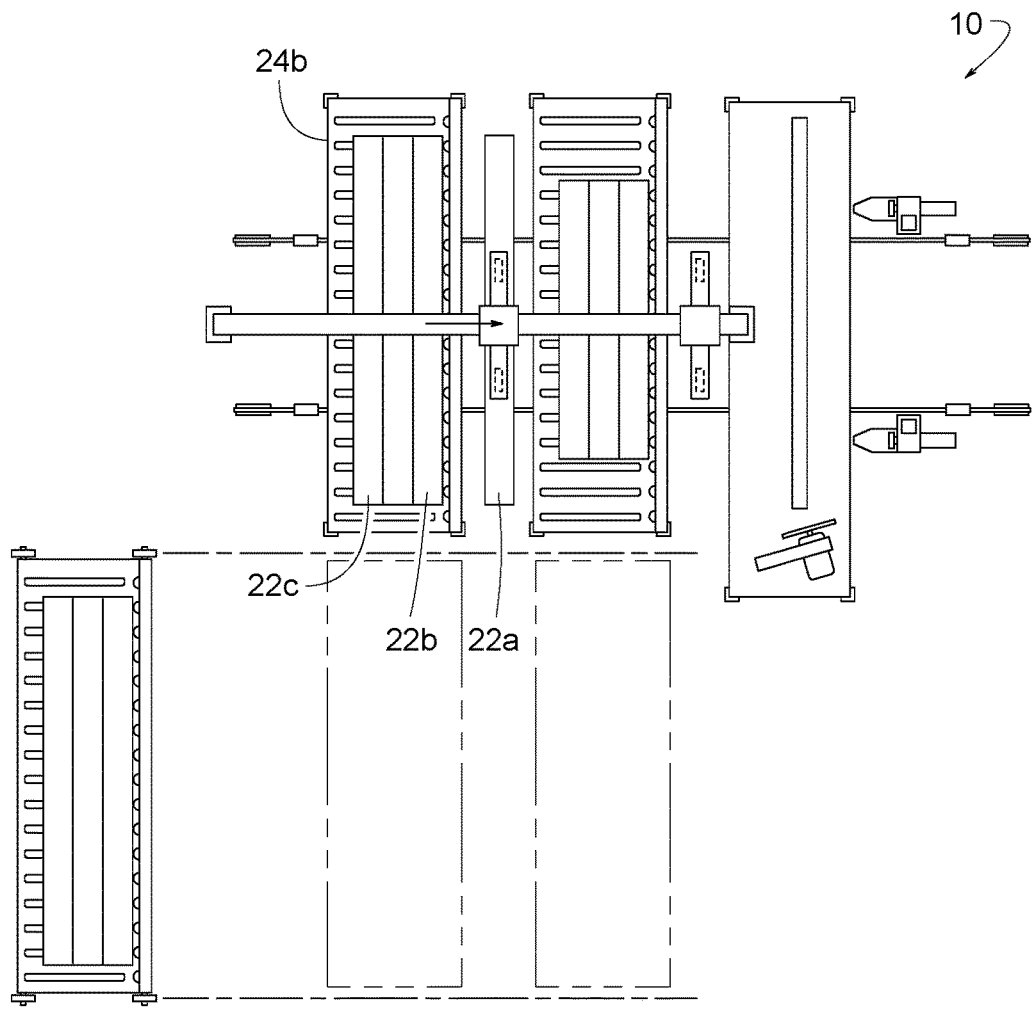
FIG. 7 is a top view of the example lumber transfer system of FIG. 1 but shown in another operating configuration.
Figure 8:
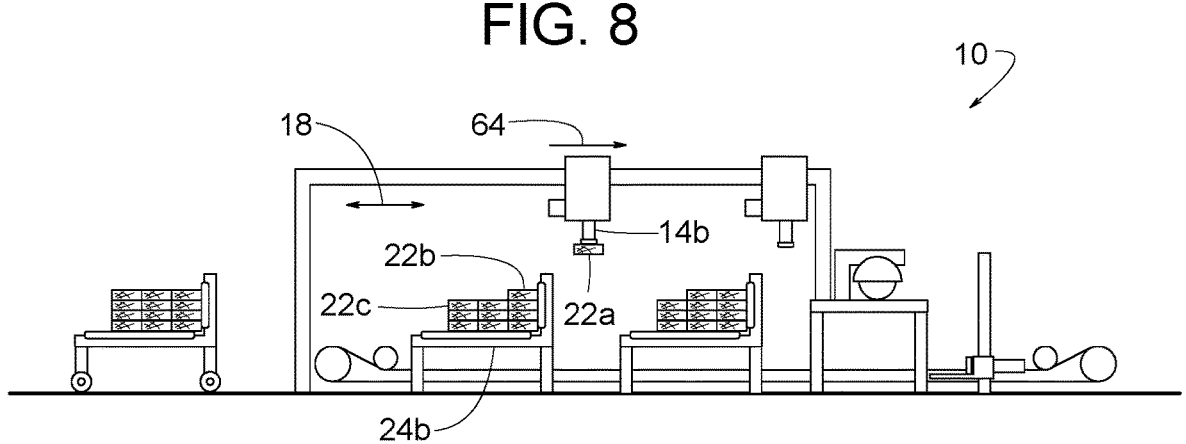
FIG. 8 is a side view of FIG. 7.

FIGS. 7 and 8 show second board picker 14b traveling forward 64 in first direction 18 to position first board 22a just past second rack 24b.

Figure 9:
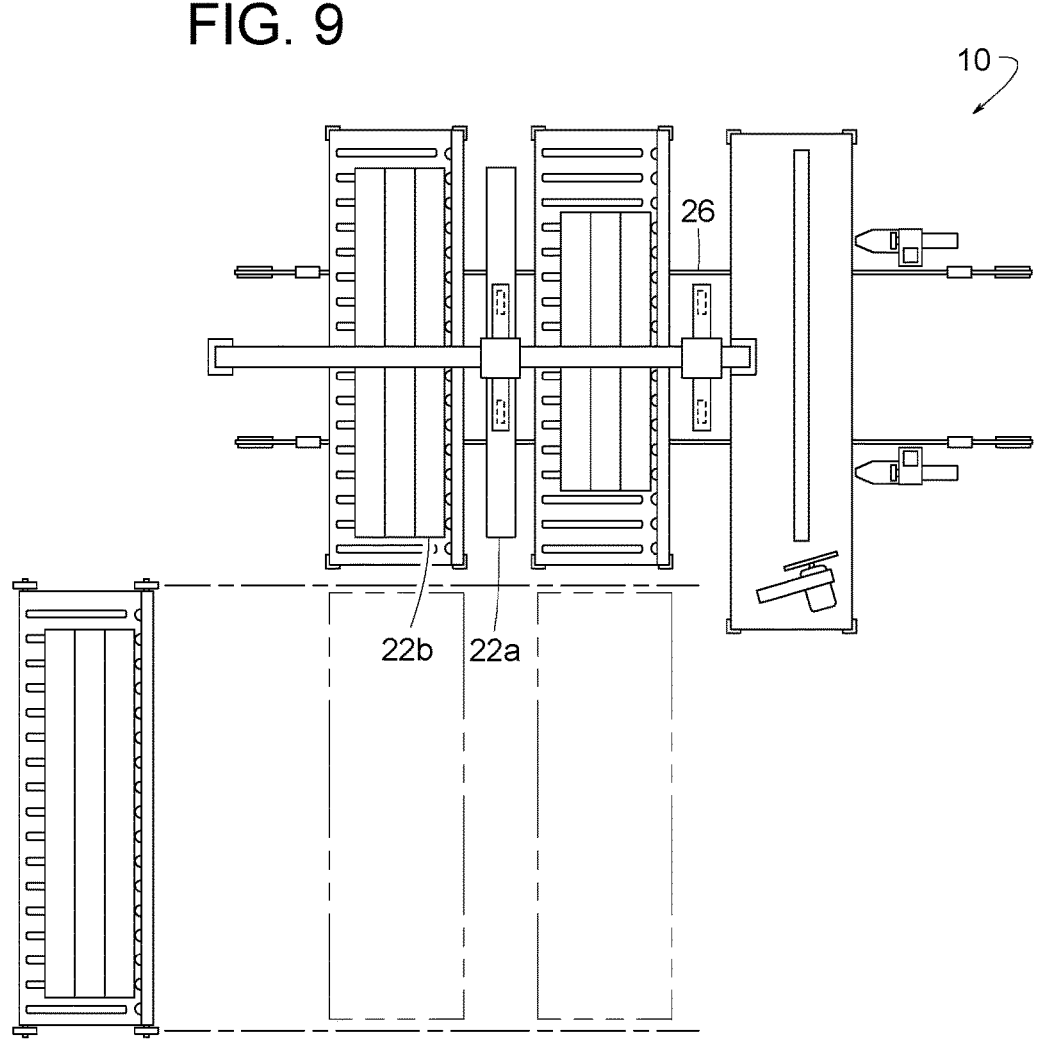
FIG. 9 is a top view of the example lumber transfer system of FIG. 1 but shown in another operating configuration.
Figure 10:
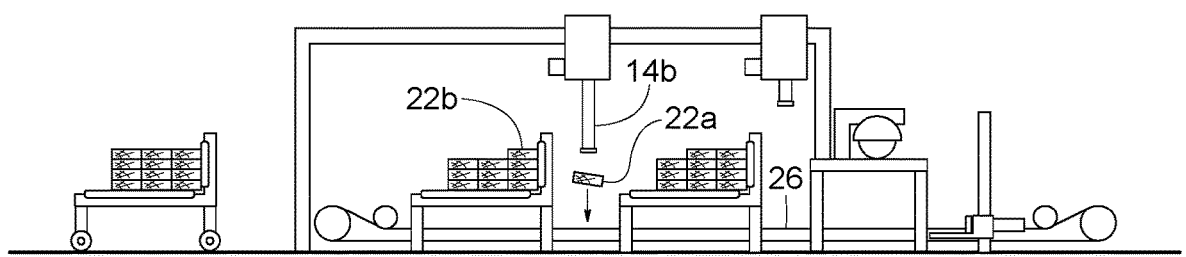
FIG. 10 is a side view of FIG. 9.

FIGS. 9 and 10 show second board picker 14b lowering and releasing first board 22a onto conveyor 26.

Figure 11:
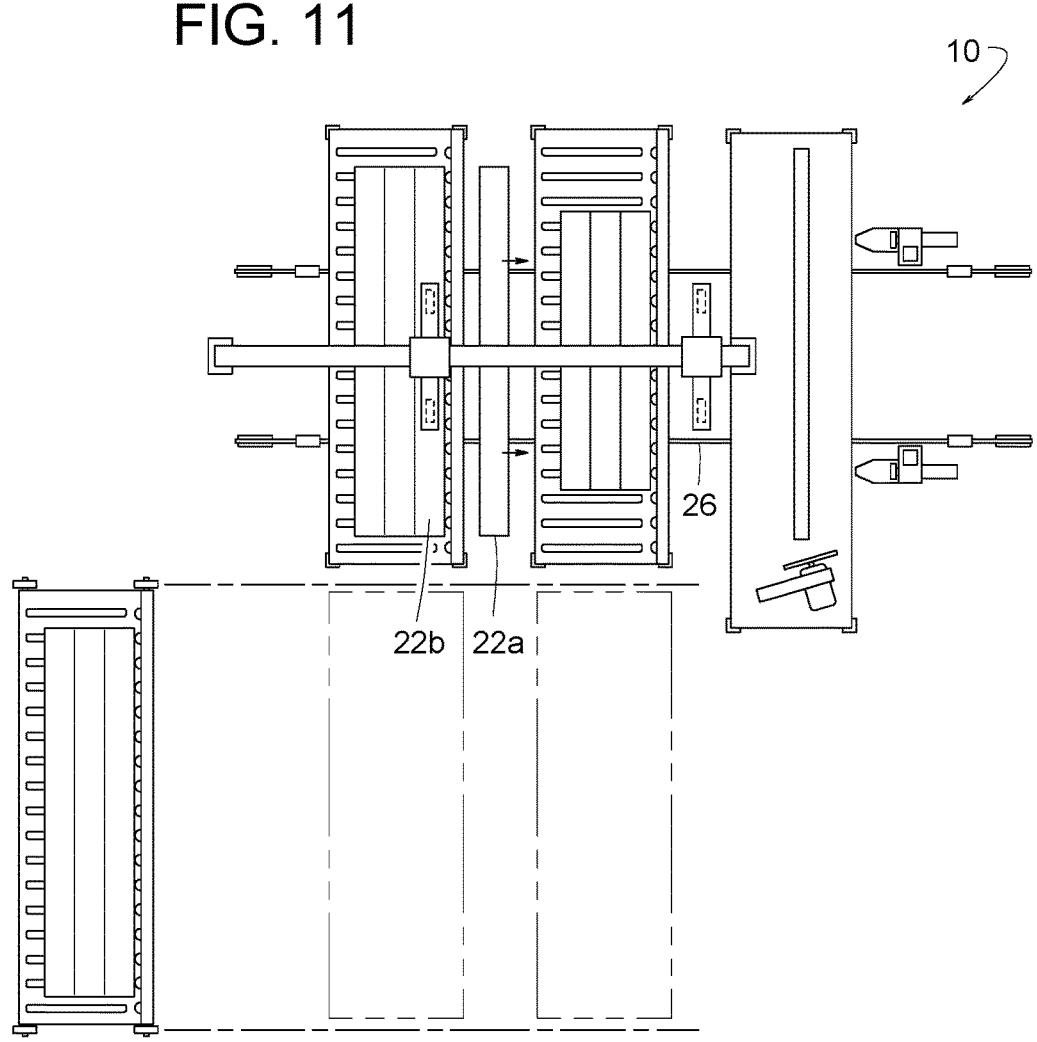
FIG. 11 is a top view of the example lumber transfer system of FIG. 1 but shown in another operating configuration.
Figure 12:
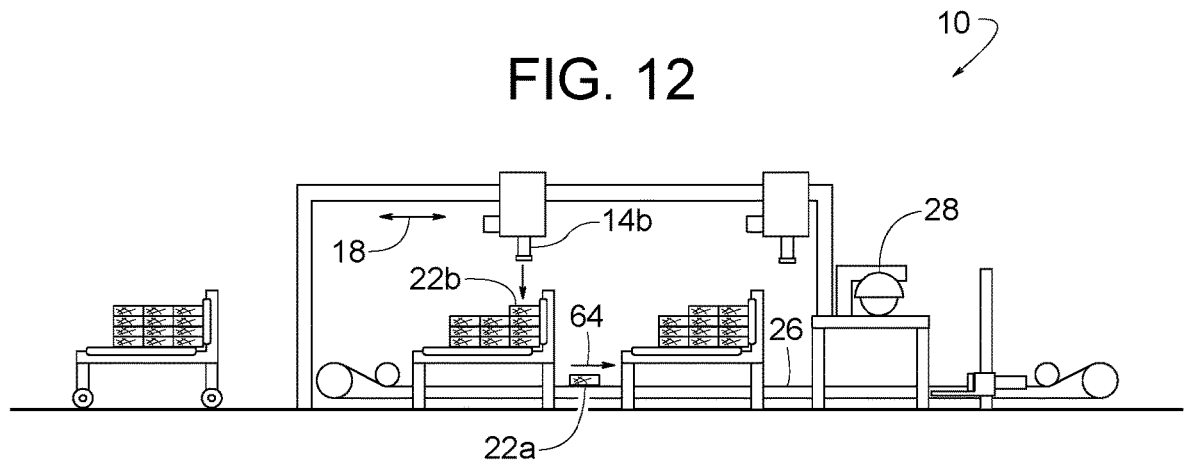
FIG. 12 is a side view of FIG. 11.

FIGS. 11 and 12 show that as conveyor 26 carries first board 22a forward 64 in first direction 18 toward saw 28, second board picker 14b goes to retrieve the next board, second board 22b. The time saving action of conveying first board 22a toward saw 28 while at the same time retrieving second board 22b is efficient use of lumber transfer system 10.

Figure 13:
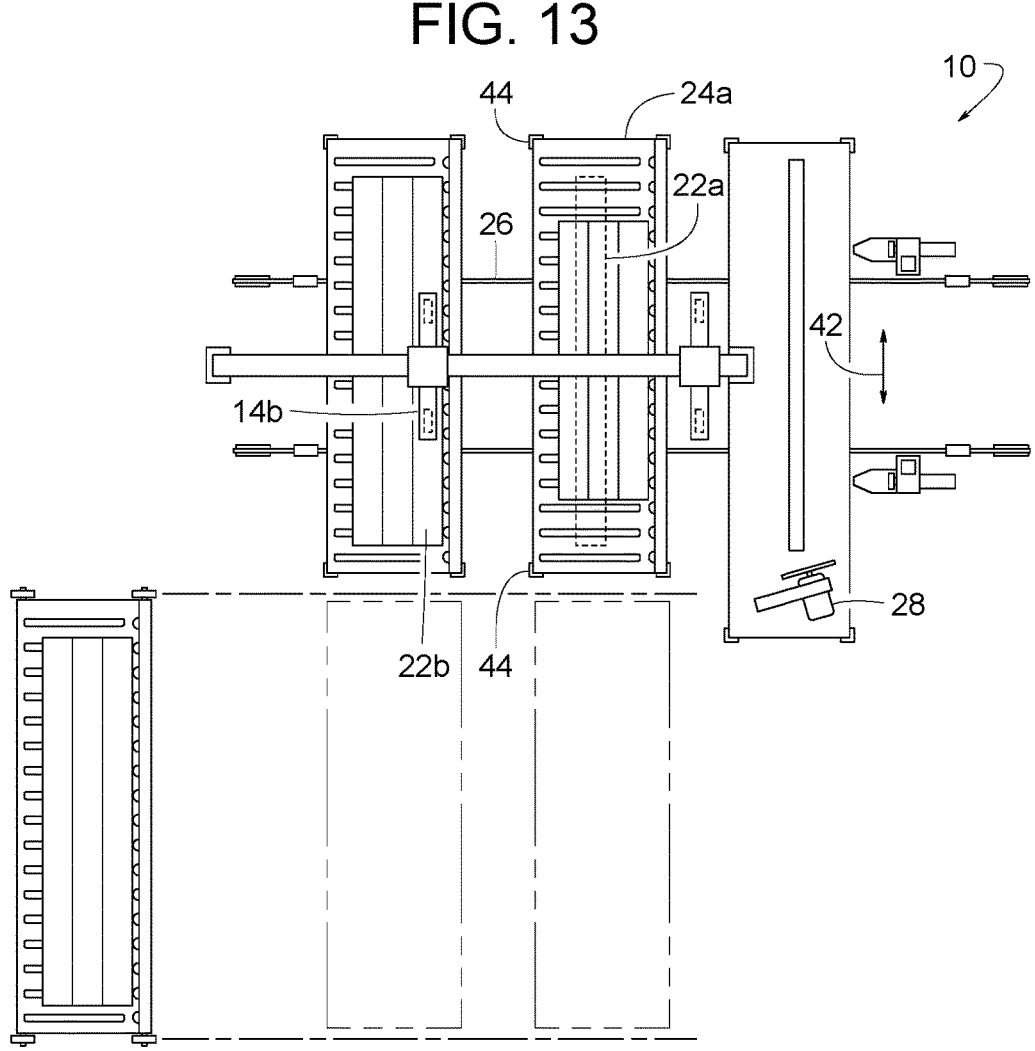
FIG. 13 is a top view of the example lumber transfer system of FIG. 1 but shown in another operating configuration.
Figure 14:
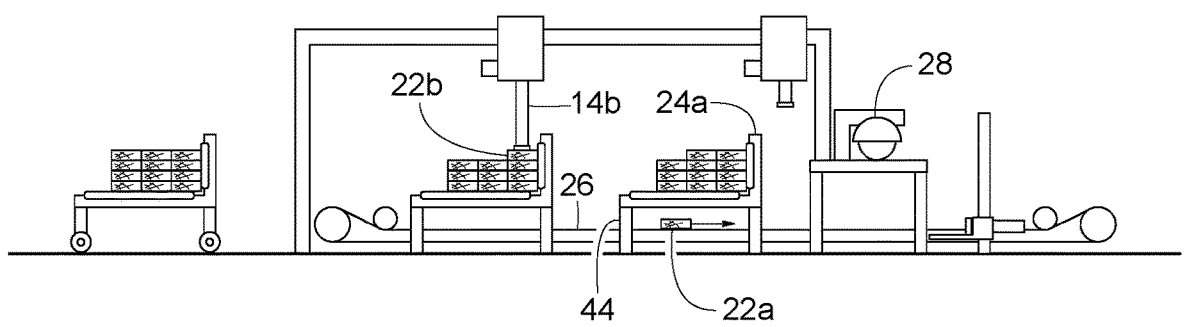
FIG. 14 is a side view of FIG. 13.

FIGS. 13 and 14 show second board picker 14b engaging second board 22b while conveyor 26 continues conveying first board 22a toward saw 28. Legs 44 of first rack 24a are spaced sufficiently apart laterally (second direction 42) to allow first board 22a to pass underneath first rack 24a.

Figure 15:
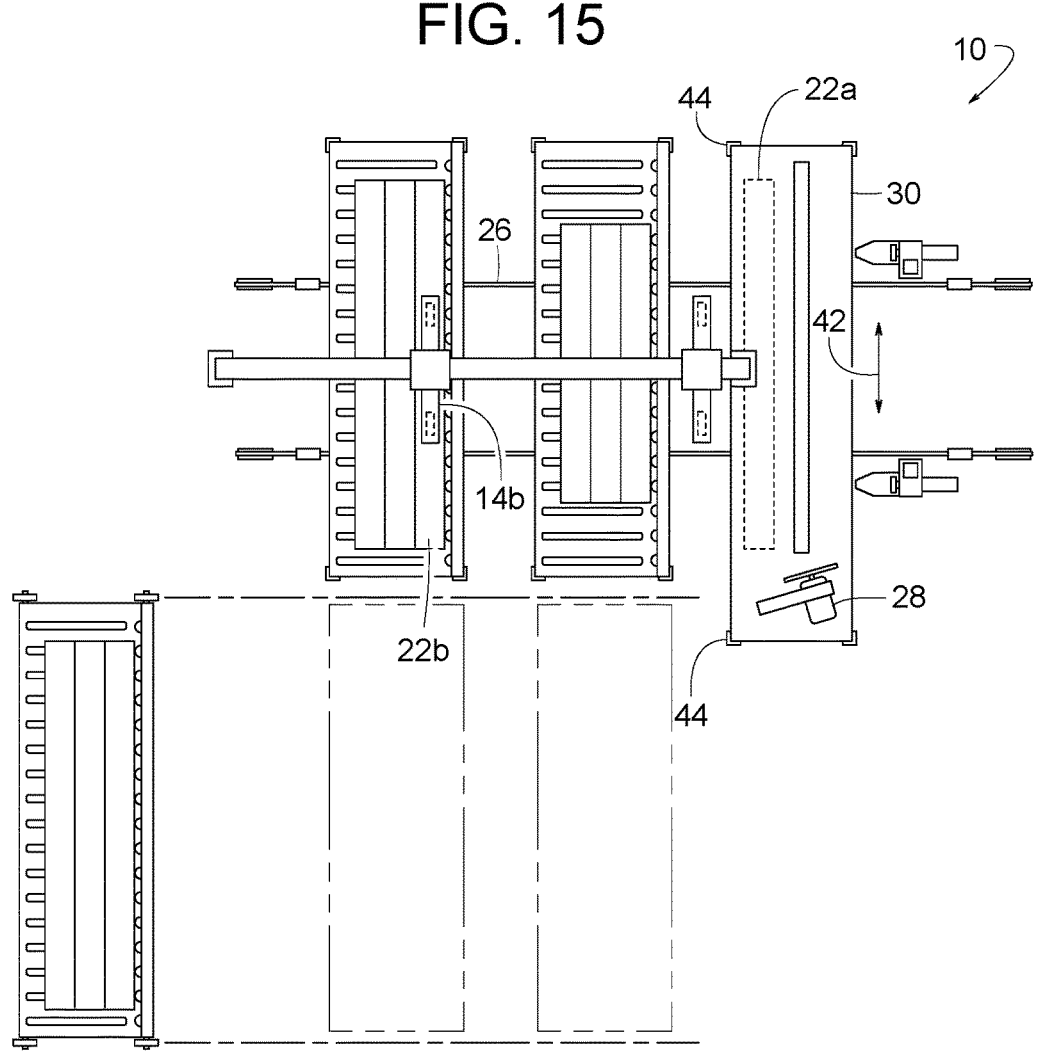
FIG. 15 is a top view of the example lumber transfer system of FIG. 1 but shown in another operating configuration.
Figure 16:
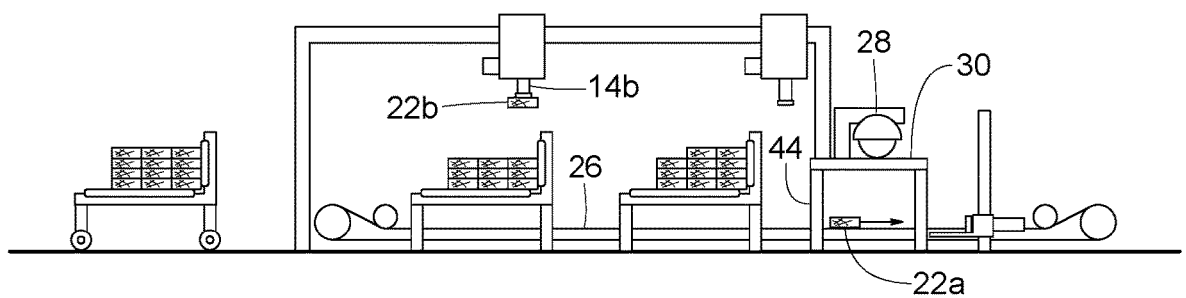
FIG. 16 is a side view of FIG. 15.

FIGS. 15 and 16 show second board picker 14b lifting second board 22b. While doing so, conveyor 26 continues moving first board 22a forward 64. Legs 44 of saw feed platform 30 (which leads to saw 28) are spaced sufficiently apart laterally to allow first board 22a to pass underneath saw feed platform 30.

Figure 17:
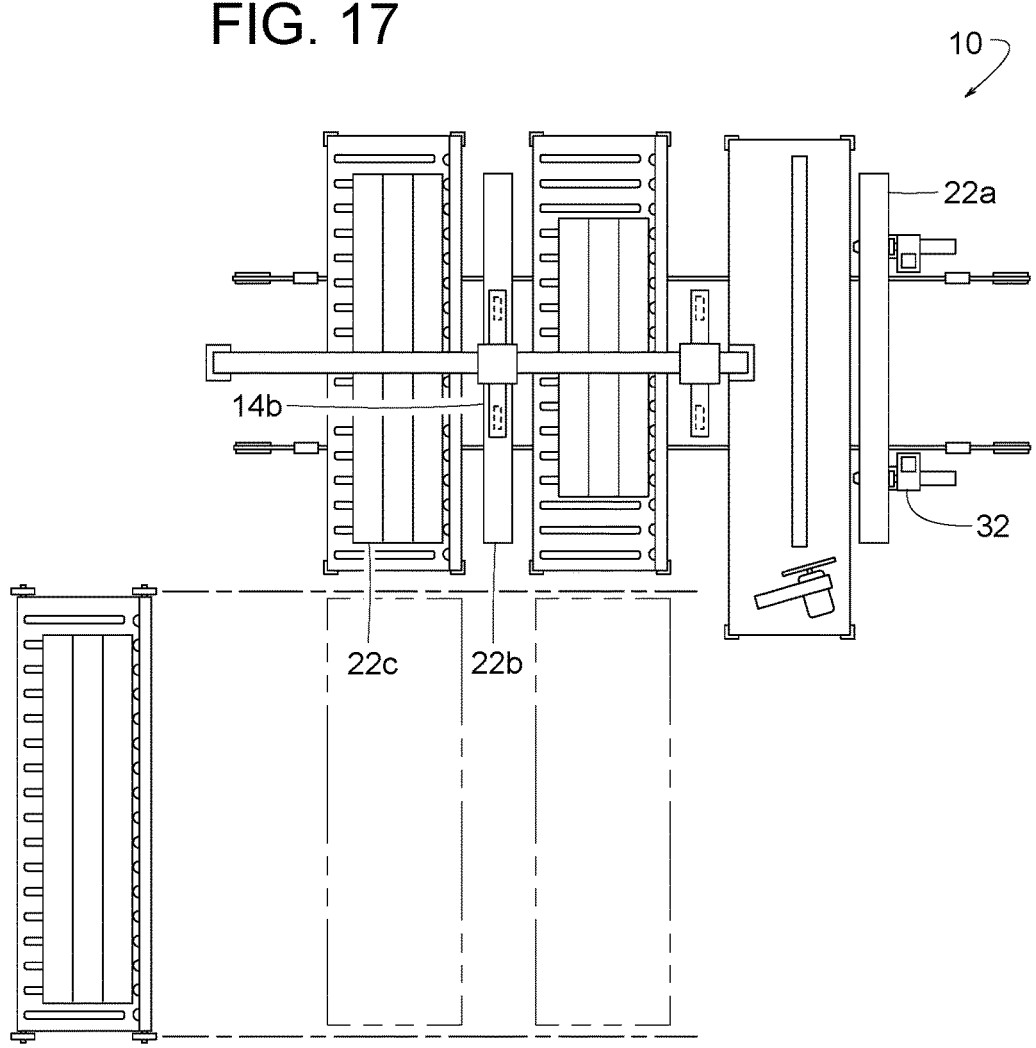
FIG. 17 is a top view of the example lumber transfer system of FIG. 1 but shown in another operating configuration.
Figure 18:
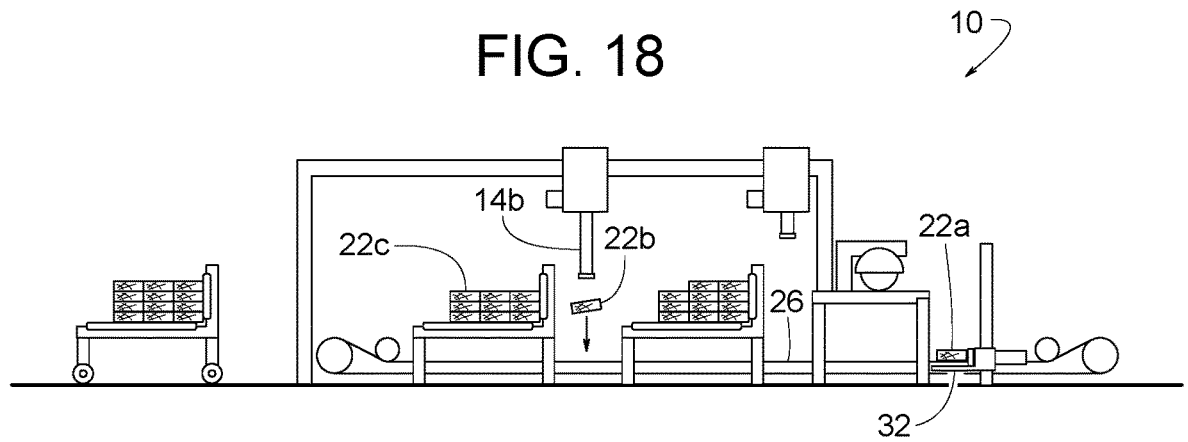
FIG. 18 is a side view of FIG. 17.

FIGS. 17 and 18 show the second board picker 14b lowering and releasing second board 22b onto conveyor 26. FIGS. 17 and 18 also show conveyor 26 having moved first board 22a onto elevator 32.

Figure 19:
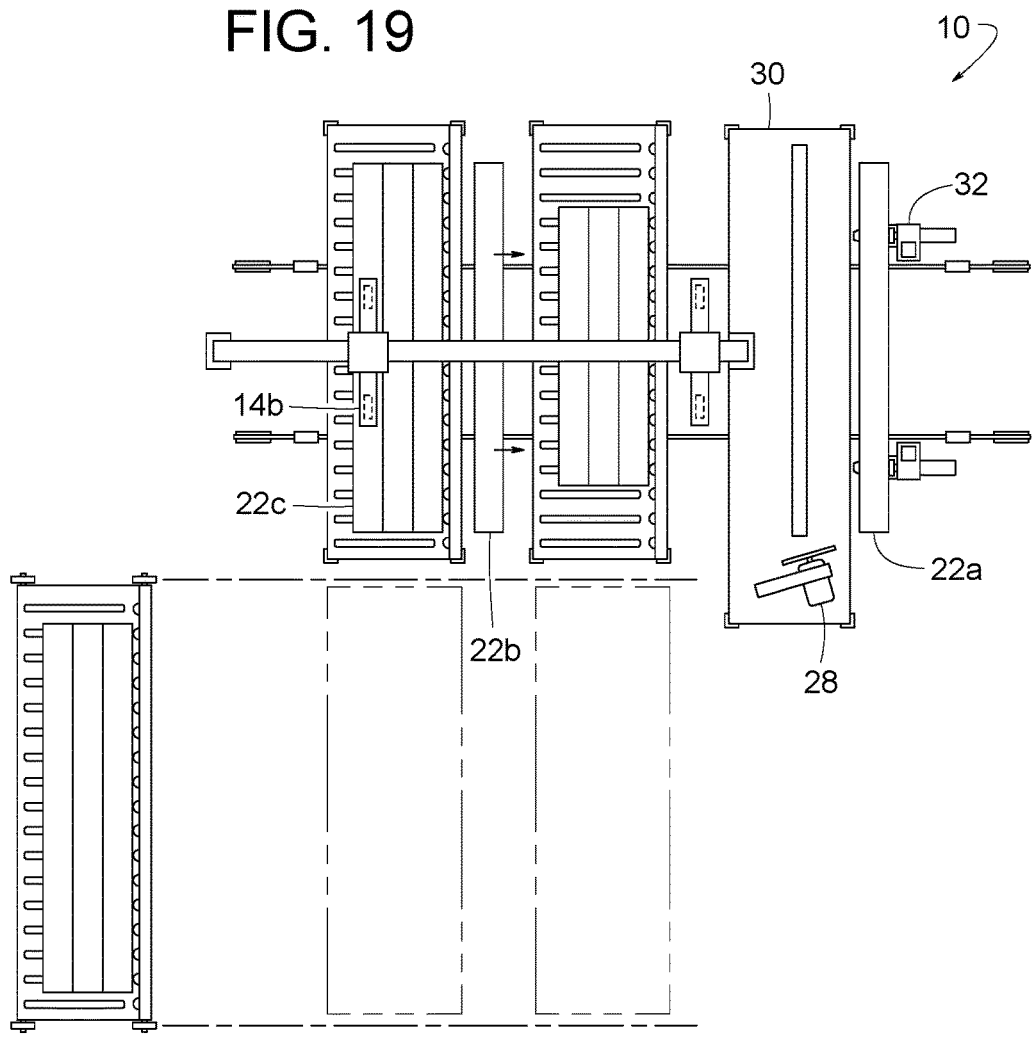
FIG. 19 is a top view of the example lumber transfer system of FIG. 1 but shown in another operating configuration.
Figure 20:
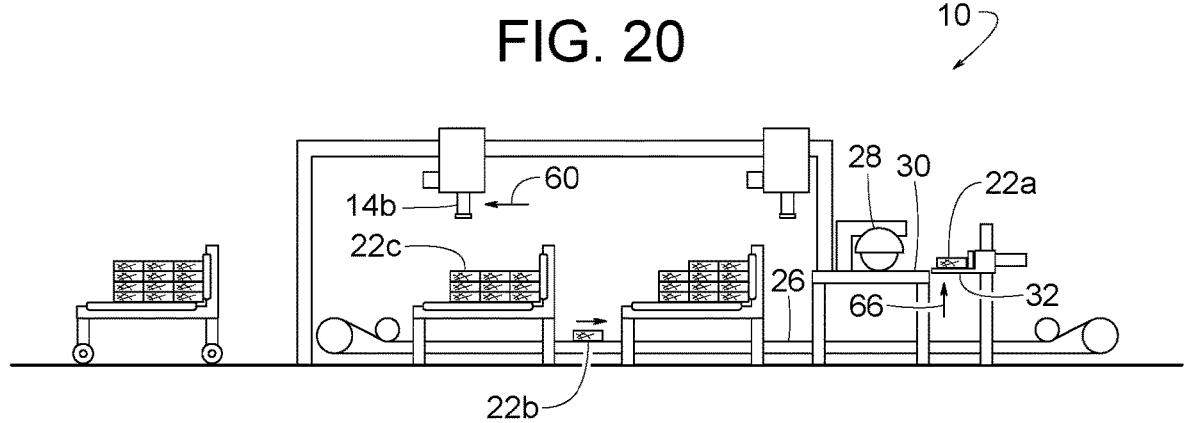
FIG. 20 is a side view of FIG. 19.

FIGS. 19 and 20 show elevator 32 lifting 66 first board 22a up to saw feed platform 30. The figures also show conveyor 26 moving second board 22b toward saw 28, just as conveyor 26 did with first board 22a. Also, second picker 14b is shown having traveled back 60 to retrieve third board 22c.

Figure 21:
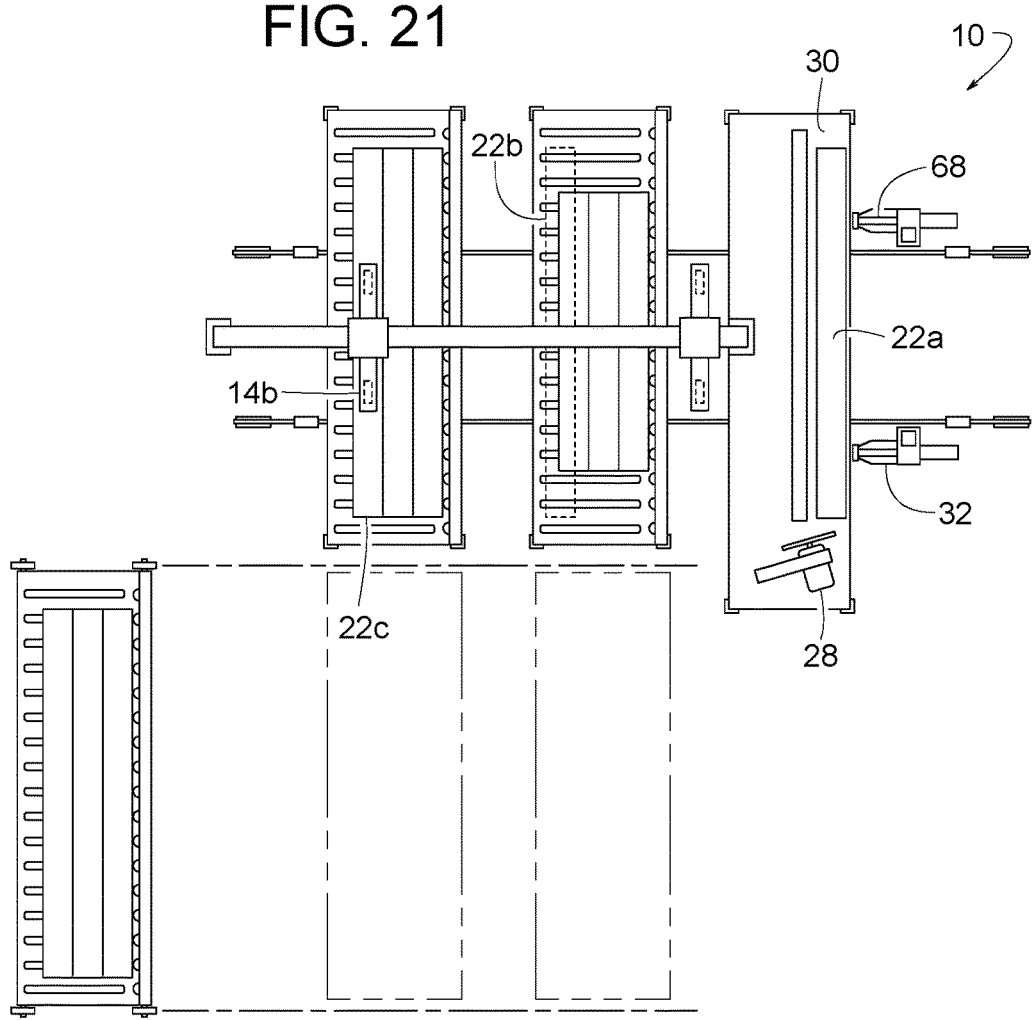
FIG. 21 is a top view of the example lumber transfer system of FIG. 1 but shown in another operating configuration.
Figure 22:
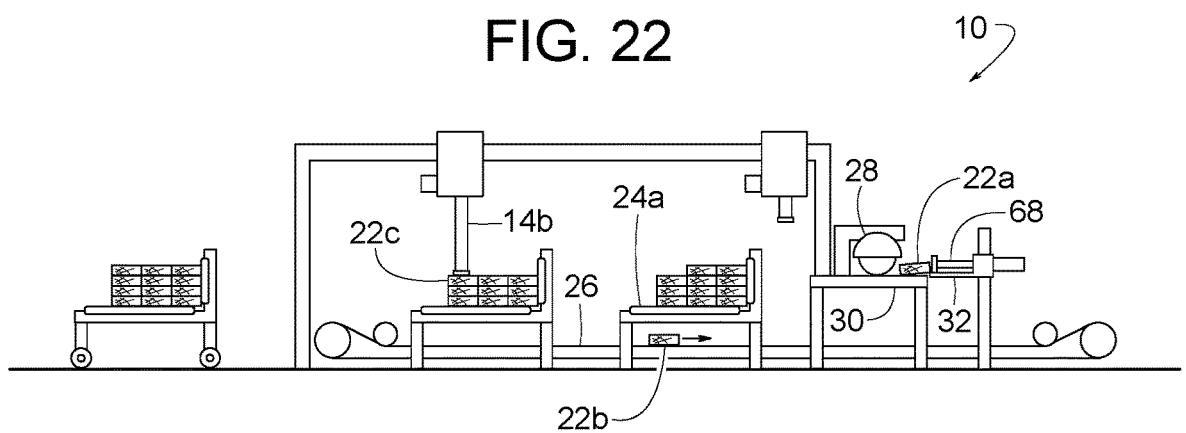
FIG. 22 is a side view of FIG. 21.

FIGS. 21 and 22 show a board pusher 68 of elevator 32 pushing first board 22a back onto saw feed platform 30. Board pusher 68 is schematically illustrated to represent any device for moving board 22 onto saw feed platform 30. Some examples of board pusher 68 include a pneumatic cylinder, a powered leadscrew, a short conveyor, a movable arm, and various combinations thereof, etc. FIGS. 21 and 22 also show conveyor 26 moving second board 22b underneath first rack 24a toward saw 28. Also, second board picker 14b is shown engaging third board 22c.

Figure 23:
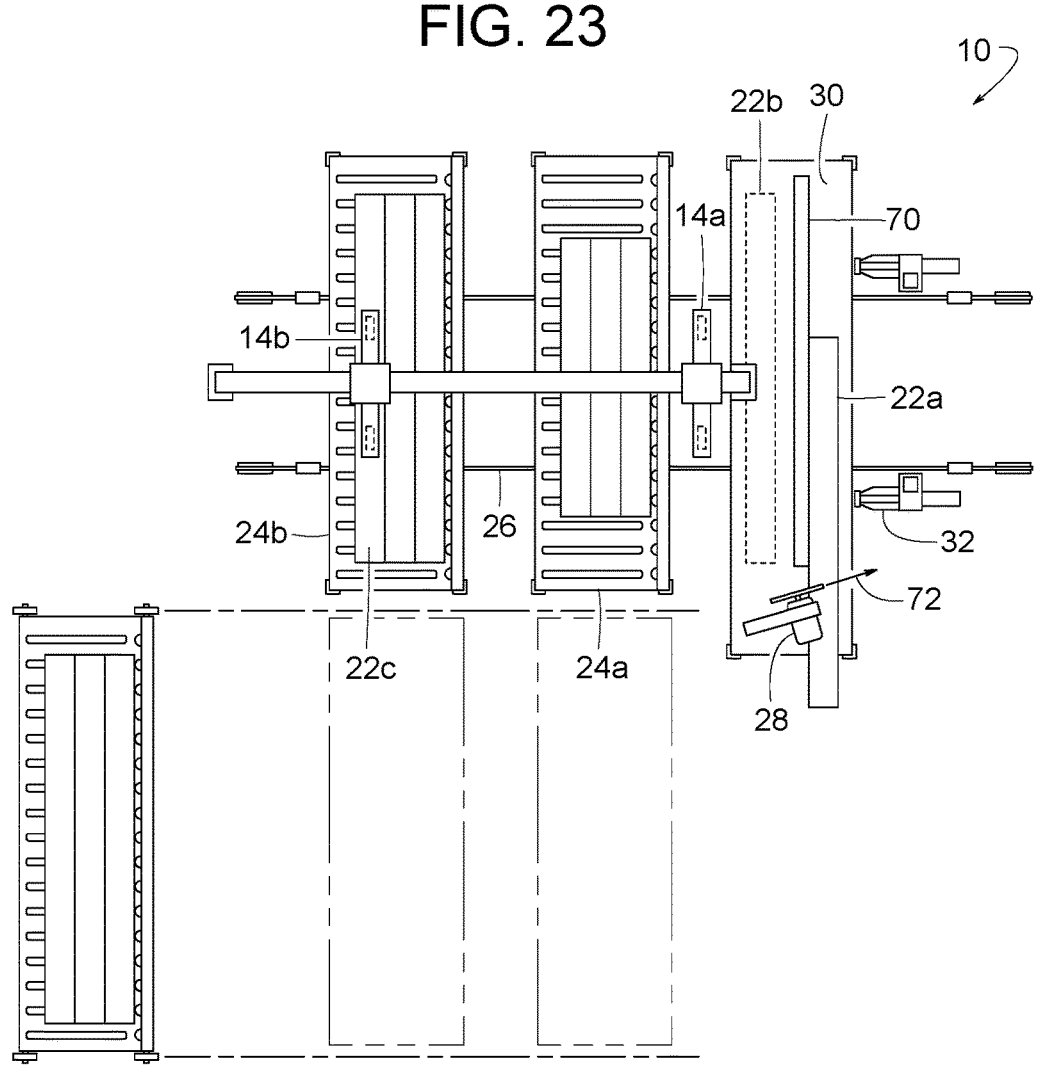
FIG. 23 is a top view of the example lumber transfer system of FIG. 1 but shown in another operating configuration.
Figure 24:
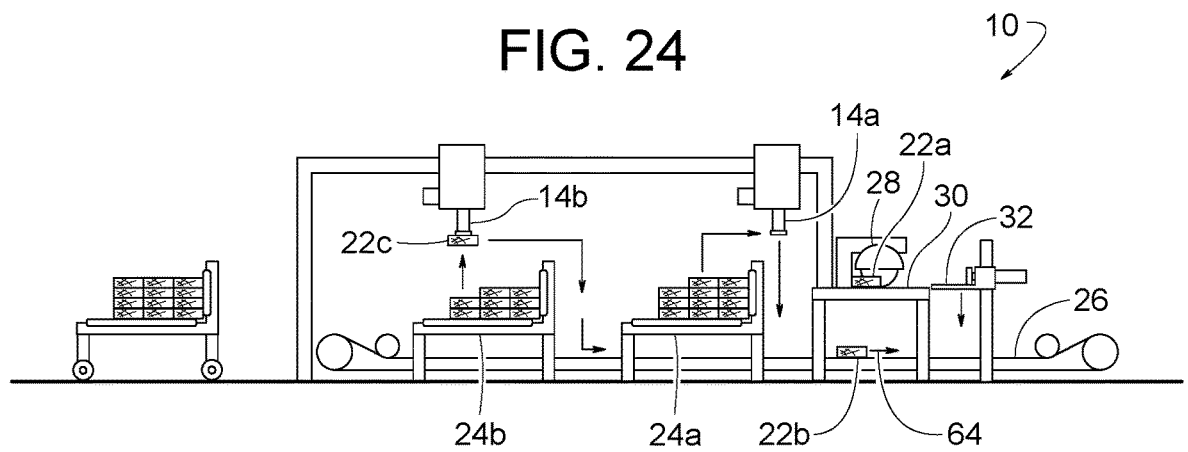
FIG. 24 is a side view of FIG. 23.
Figure 25:
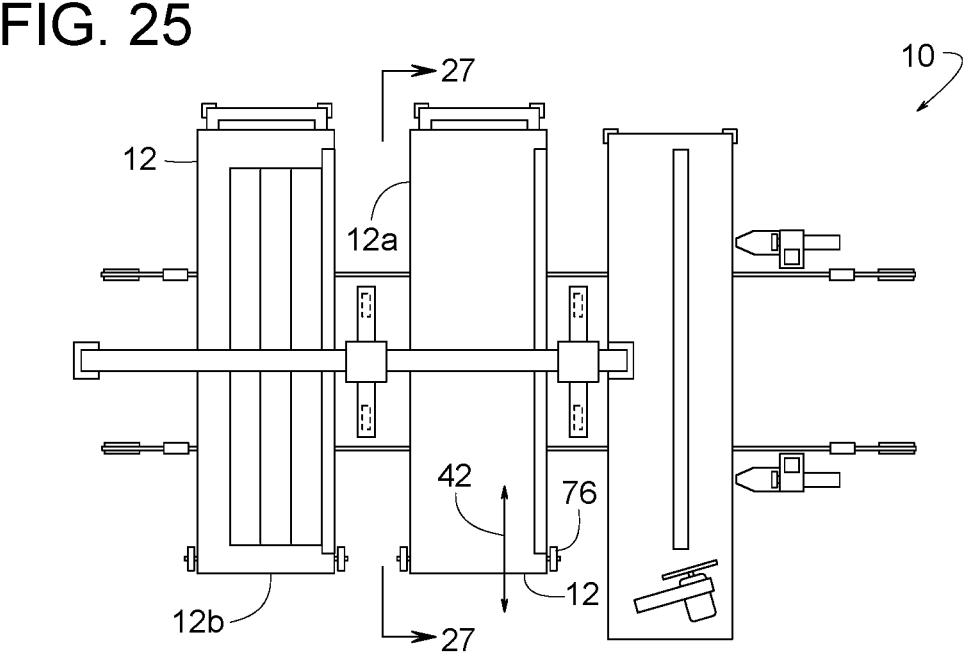
FIG. 25 is a top view similar to FIG. 1 but showing the example lumber transfer system with a laterally extendable rack.
Figure 26:
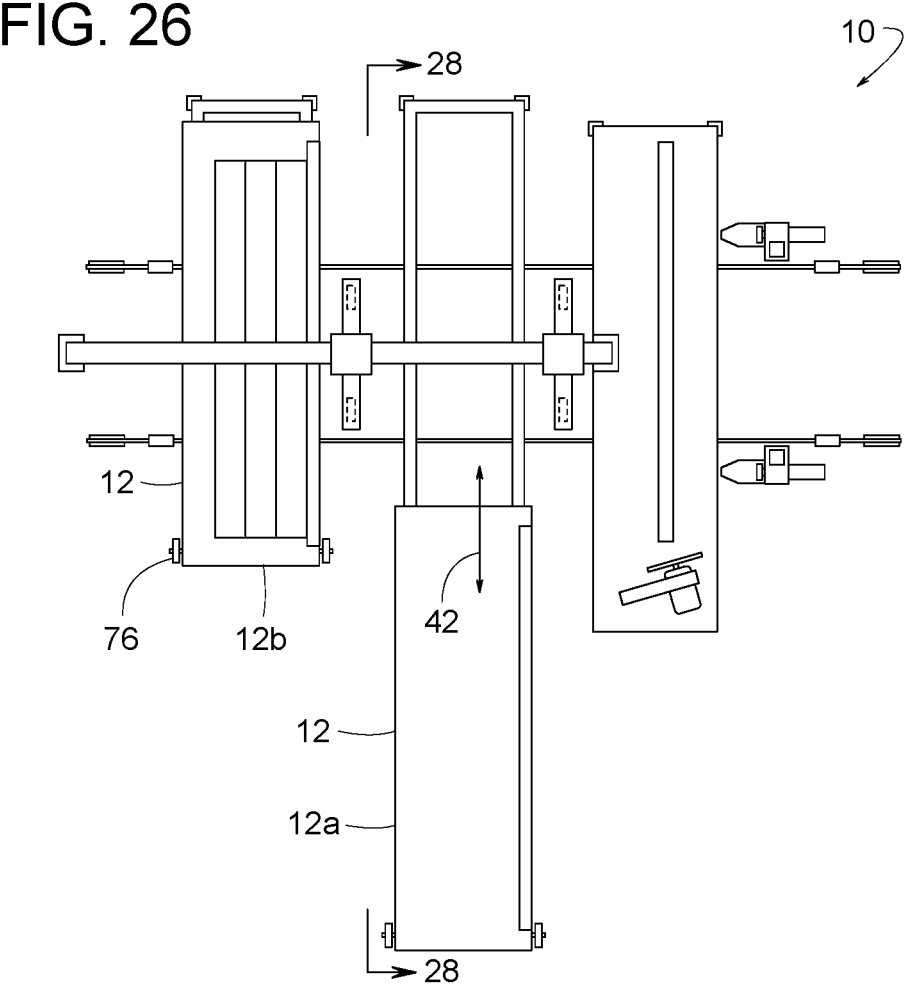
FIG. 26 is a top view similar to FIG. 25 but showing one of the racks extended.

FIGS. 23 and 24 show first board 22a pushed against a fence 70 of saw feed platform 30, so saw 28 can accurately cut first board 22a. Arrow 72 of FIG. 23 represents cutting board 22 with saw 28. The figures also show second board 22b traveling forward 64 underneath saw feed platform 30. Also, second board picker 14b is shown transferring third board 22c to conveyor 26.

Moreover, while the cycle illustrated in FIGS. 1-24 continues as needed, first board picker 14a can be activated to transfer boards 22 to conveyor 26 as well. In some examples, the first and second board pickers 14a and 14b can pick from either the first or second rack 24a or 24b. Board pickers 14, however, are controlled so as to avoid interfering with each other and to avoid overloading elevator 32, saw feed platform 30 or saw 28.

In the example shown in FIGS. 25-28, a first rack 12a and a second rack 12b are extendible in lateral direction 42 to facilitate loading racks 12a and 12b without the need for shuttle cart 34. In some examples, racks 12a and 12b are extendible by means of a roller-supported telescopic mechanism 74. Telescopic mechanism 74 is similar in operation to a known drawer-glide; however, wheels 76 are used for supporting one end of the racks 12a and 12b.

Figure 29:
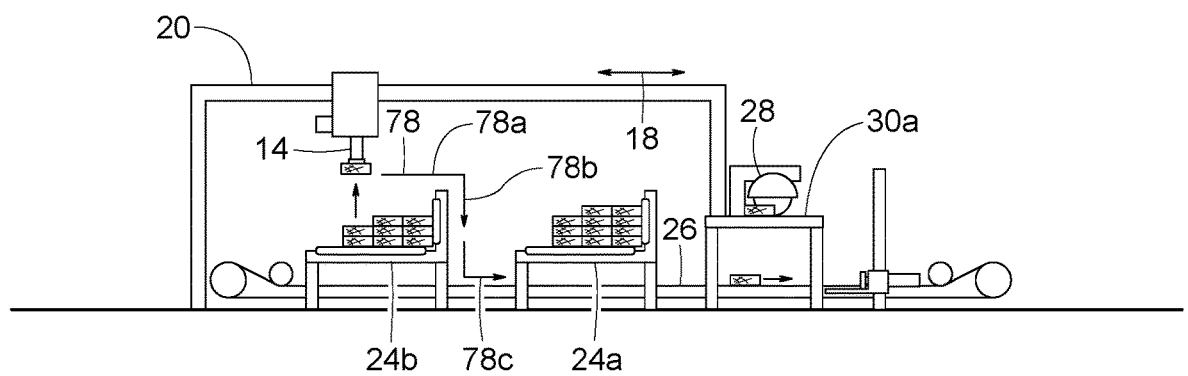
FIG. 29 is a side view of another example lumber transfer system.
Figure 30:
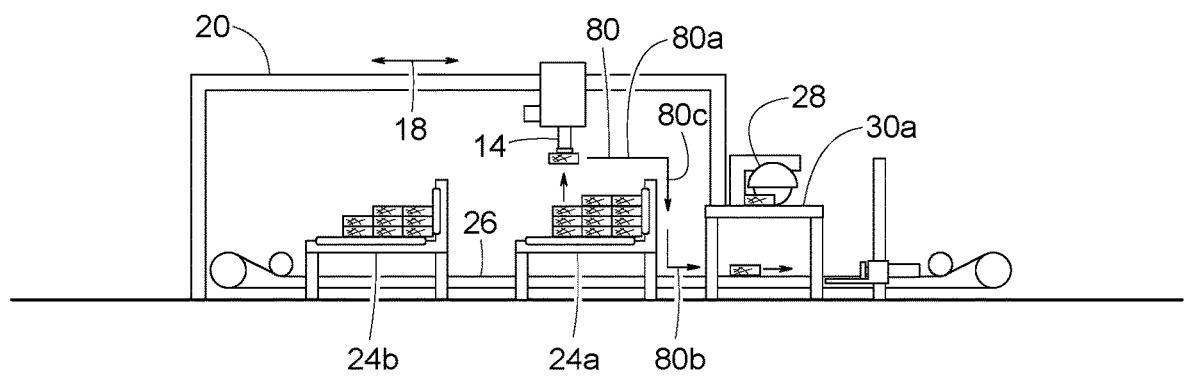
FIG. 30 is a side view similar to FIG. 29 but showing the lumber transfer system in another operating configuration.

Some examples of the lumber transfer system 10 have any number of racks 24 (or racks 12), any number of board pickers 14, and any number of saws 28. In some examples, the number of racks 24 equals the number of board pickers 14. In other examples, there are more racks 24 than board pickers 14. In some examples, a single board picker 14 retrieves boards 22 from multiple racks 24 to feed a single saw 28, as shown in FIGS. 29 and 30. In some examples, a single board picker 14 retrieves boards 22 from multiple racks 24 to feed a plurality of saws 28, as shown in FIGS. 31-33. In some examples, multiple board pickers 14 (e.g., two board pickers 14 or any number of board pickers 14) retrieve boards 22 from multiple racks 24 to feed a plurality of saws 28 (e.g., four saws 28 or any number of saws 28). A controller (computer, PLC, etc.) is operatively connected to one or more board pickers 14, one or more elevators 32, and/or one or more saws 28 to coordinate their operation and avoid part flow congestion, collisions and other conflicting actions.

FIG. 29 shows first rack 24a, second rack 24b, track system 20, and conveyor 26 defining a board travel path 78 that includes an upper route 78a extending in first direction 18, a lower route 78c extending in first direction 18, and a descent route 78b extending between upper route 78a and lower route 78c. Upper route 78a is higher than lower route 78c, and upper route 78a extends from above second rack 24b toward descent route 78b. Descent route 78b is between first rack 24a and second rack 24b, lower route 78c extends from descent route 78b to underneath first rack 24a and toward first saw feed platform 30a.

FIG. 30 shows first rack 24a, track system 20, and conveyor 26 defining a board travel path 80 that includes an upper route 80a extending in first direction 18, a lower route 80c extending in first direction 18, and a descent route 80b extending between upper route 80a and lower route 80c. Upper route 80a is higher than lower route 80c, upper route 80a extends from above first rack 24a toward descent route 80c, and lower route 80b extends from descent route 80c toward first saw feed platform 30a.

In the example shown in FIGS. 31 and 32, saw feed platform 30 (e.g., saw feed platform 30a and saw feed platform 30b) includes an alternate example elevator 82. Elevator 82 is schematically illustrated to represent any apparatus that can lift board 22 up to saw feed platform 30 while allowing other boards 22 to pass by underneath elevator 82. Some examples of elevator 82 include a vertical conveyor with vertically traveling board-supporting lugs, an inclined conveyor with board supporting lugs that travel upward along an inclined path, vertical lift arms with board-supporting rollers, and a swing-up arm 84 for pivotally moving board 22 up onto saw feed platform 30. In the example of elevator 82 with swing-up arm 84, the swing-up feature allows elevator 82 to swing up and away from conveyor 26 to let a board 22 travel past one elevator 82 to reach a second chosen elevator 82. Some examples of the swing-up version of elevator 82 include rollers 86 to help feed a board 22 from elevator 82 to saw feed platform 30.

As mentioned earlier, in the example shown in FIG. 33, track system 20 is supported by laterally spaced apart legs 58' that allow boards 22 to pass therebetween, basically in the same way boards 22 pass between laterally spaced apart legs 44 of racks 24. The term, "laterally" refers to a direction parallel to second direction 42 (see FIG. 1). In other words, the track system's laterally spaced-apart legs 58' straddle board 22 as conveyor 26 moves board 22 toward one of the elevators 82. The term, "track system" refers to an apparatus comprising one or more tracks. Some example track systems include a single track, two separate tracks, etc.

Although certain example methods, apparatus and articles of manufacture have been described herein, the scope of the coverage of this patent application is not limited thereto. On the contrary, this patent application covers all methods, apparatus and articles of manufacture fairly falling within the scope of the appended claims either literally or under the doctrine of equivalents.

The invention claimed is:

1. A lumber transfer system for transferring a plurality of boards from a first stack of lumber and a second stack of lumber toward at least one of a first saw and a second saw, the plurality of boards includes a first board and a second board, the lumber transfer system comprising:

a first rack to support the first stack of lumber thereon, the first rack being elongate in a second direction that is substantially perpendicular to a first direction;

a second rack to support the second stack of lumber thereon, the second rack being elongate in the second direction;

a first saw feed platform leading to the first saw, the first saw feed platform being elongate in the second direction, the first rack being interposed between the first saw feed platform and the second rack with respect to the first direction;

a track system above the first rack and the second rack;

a first board picker movable along the track system over at least one of the first rack and the second rack; and a conveyor extending underneath the first rack and running in the first direction between the first rack and the first saw feed platform.

2. The lumber transfer system of claim 1, wherein the conveyor extends underneath both the first rack and the second rack.

3. The lumber transfer system of claim 1, further comprising a second board picker movable along the track system over the second rack, the first board picker being movable over the first rack, and the second board picker being movable relative to the first board picker.

4. The lumber transfer system of claim 1, further comprising an elevator to lift the first board from the conveyor up onto the first saw feed platform, wherein the first saw feed platform is between the elevator and the first rack with respect to the first direction.

5. The lumber transfer system of claim 4, wherein the elevator includes a board pusher to move the board in the first direction onto the first saw feed platform.

6. The lumber transfer system of claim 1, further comprising an elevator to lift the first board from the conveyor up onto the first saw feed platform, wherein the elevator is between the first saw feed platform and the first rack with respect to the first direction.

7. The lumber transfer system of claim 6, wherein the elevator includes a swing-up arm to pivotally move the board up onto the first saw feed platform.

8. The lumber transfer system of claim 1, further comprising a second saw feed platform leading to the second saw, the first saw feed platform being between the second saw feed platform and the first rack with respect to the first direction, and the conveyor extends underneath the first saw feed platform.

9. The lumber transfer system of claim 1, further comprising a shuttle cart being elongate in the second direction, the shuttle cart being movable in the first direction, and the shuttle cart includes a plurality of rollers to facilitate transferring at least some of the plurality of boards from the shuttle cart onto selectively the first rack and the second rack.

10. The lumber transfer system of claim 1, wherein the first rack is extendible in the second direction to facilitate loading of the first rack with the plurality of boards.

11. The lumber transfer system of claim 1, wherein the track system includes two track legs that are laterally spaced apart in the second direction to define a board passageway therebetween, wherein the conveyor extends through the board passageway between the two track legs.

12. The lumber transfer system of claim 1, wherein the conveyor is longer than the track system with respect to the first direction.

13. The lumber transfer system of claim 1, wherein the first rack, the track system, and the conveyor define a board travel path that includes an upper route extending in the first direction, a lower route extending in the first direction, and a descent route extending between the upper route and the lower route, the upper route being higher than the lower route, the upper route extending from above the first rack toward the descent route, and the lower route extending from the descent route toward the first saw feed platform.

14. The lumber transfer system of claim 13, wherein lower route also extends underneath the first saw feed platform.

15. The lumber transfer system of claim 1, wherein the first rack, the second rack, the track system, and the conveyor define a board travel path that includes an upper route extending in the first direction, a lower route extending in the first direction, and a descent route extending between the upper route and the lower route, the upper route being higher than the lower route, the upper route extending from above the second rack toward the descent route, the descent route being between the first rack and the second rack, the lower route extending from the descent route, underneath the first rack and toward the first saw feed platform.

16. A lumber transfer method for transferring at least one of a first board and a second board from a second rack, past a first rack and onto a saw feed platform that leads to a saw, wherein both the first rack and the second rack support a plurality of boards, and the lumber transfer method involves the use of a conveyor, the lumber transfer method comprising:
   lifting the first board up from the second rack;
   lowering the first board down onto the conveyor after lifting the first board up from the second rack;
   conveying the first board underneath the first rack via the conveyor;
   lifting the first board up from the conveyor after conveying the first board underneath the first rack; and
   lifting the first board up onto the saw feed platform after conveying the first board underneath the first rack.

17. The lumber transfer method of claim 16, further comprising:
   cutting the first board with the saw; and
   lifting the second board up from the second rack after lifting the first board up from the second rack but before lifting the first board up onto the saw feed platform.

18. A lumber transfer method for transferring at least one of a first board and a second board from a rack, past a first saw feed platform that leads to a first saw, and to a second saw feed platform that leads to a second saw, the lumber transfer method comprising:
   lifting the first board up from the rack;
   conveying the first board underneath the first saw feed platform sometime after lifting the first board up from the rack; and
   lifting the first board up onto the second saw feed platform after conveying the board underneath the first saw feed platform.

19. The lumber transfer method of claim 18, further comprising:
   cutting the first board with the second saw; and
   lifting the second board up from the rack after lifting the first board up from the rack but before cutting the first board with the second saw.

20. The lumber transfer method of claim 18, further comprising using a conveyor for conveying the board underneath the first saw feed platform and using a board picker and a track system for lifting the board up from the rack.

* * * * *